United States Patent [19]

Marquis et al.

[11] Patent Number: 5,348,712
[45] Date of Patent: Sep. 20, 1994

[54] USE OF CARBONATES IN METAL ION EXTRACTION

[75] Inventors: Edward T. Marquis; Martin J. Plishka, both of Austin, Tex.

[73] Assignee: Texaco Chemical Company, White Plains, N.Y.

[21] Appl. No.: 15,017

[22] Filed: Feb. 9, 1993

[51] Int. Cl.$^5$ .................... C22B 11/00; C22B 43/00
[52] U.S. Cl. ................................ 423/22; 423/24; 423/99; 423/1
[58] Field of Search ............... 423/8, 21.5, 22, 24, 423/54, 63, 70, 100, 139, 99

[56] References Cited

U.S. PATENT DOCUMENTS

| | | | |
|---|---|---|---|
| 3,912,801 | 10/1975 | Stephens | 423/8 |
| 4,159,943 | 7/1979 | Petrovich | 423/26 |
| 4,499,057 | 2/1985 | Burgard et al. | 423/100 |
| 4,990,639 | 2/1991 | Bexton et al. | 423/22 |

OTHER PUBLICATIONS

W. I. Harris, et al., "The Extraction of Gold from Cyanide Solutions Using Moderate Base Polyamine Ion Exchange Resins," *Reactive Polymers,* vol. 17, 1992, pp. 21–27.

*Primary Examiner*—Wayne Langel
*Assistant Examiner*—Steven Bos
*Attorney, Agent, or Firm*—Russell R. Stolle; David L. Mossman

[57] ABSTRACT

It has been discovered that relatively large cyclic and open chain carbonates are extremely efficient in the selective extraction of metal ions, such as gold, silver, platinum and mercury from aqueous solution without the need for a potentially hazardous, organic solvent or use of a corrosive salt, such as NaCl. For example, 1,2-decane carbonate extracted >99.9% mercury, 99.76% gold, 97.5% silver and 79.0% platinum. The homologous 1,2-dodecane carbonate was found to extract 99.9% gold and silver from aqueous solution and 95.8% platinum. Didecyl carbonate extracted 77% gold from aqueous solution. The method of this invention is simpler than prior techniques and eliminates the need for potentially hazardous solvents (toxic, flammable and environmentally unfavorable) and corrosive additives, such as salt, NaCl, used as a salting agent in prior methods.

7 Claims, No Drawings

USE OF CARBONATES IN METAL ION EXTRACTION

FIELD OF THE INVENTION

The invention relates to methods of extracting metals from solutions, and, in one aspect, more particularly relates to extracting metals from aqueous solutions using organic carbonates.

BACKGROUND OF THE INVENTION

Currently many metals are recovered by hydrometallurgy methods. These often consist of combinations of leaching, adsorption and electro-winning or precipitation. However, disadvantages exist with each of these processes from the view of economics of the process, purity of the metal obtained, toxicity of the materials used, difficulty of recovery of the pure metal, and the like. For example, conventional processes for mining gold involve extracting the gold from the ore using a basic cyanide solution. The dilute solution is purified and concentrated by various ways, normally solid adsorbents. Techniques to recover other metals are as troublesome and expensive. In particular, the presence of other undesired metals together with the valued ones decrease the efficiency of the process.

W. I. Harris, et al. in "The Extraction of Gold from Cyanide Solutions Using Moderate Base Polyamine Ion Exchange Resins," Reactive Polymers, Vol. 17, 1992, pp. 21–27 describe that two polyamine moderate base resins were synthesized from 1,3-diaminopropane or 2,4-diamino-2-methylpentane and chloromethylated styrene-divinylbenzene copolymers. The resins were evaluated for gold recovery from cyanide solutions. The effects of solution pH on the resin gold loadings were determined over the pH range 5–12. The selectivities of the resins for gold cyanide over base metal cyanides were determined. These moderate base polyamine resins were compared against dimethylamine type resins with high and low salt splitting capacity for gold cyanide recovery. The resins possess good selectivities for gold, good loading capacities, good elution properties and can operate at the pH of most leaching streams without acid adjustment.

Large organic ring structures are known to be useful as chelating agents for selective binding and extraction of cartons. Cyclic organic carbonates have been found, along with mixtures of the same with other organic liquids that are miscible therewith, to extract certain metals in stable complex or simple salt form from a medium in which the solvent is not completely soluble, according to U.S. Pat. No. 3,912,801. Extractable metals include gold, platinum, palladium, rhodium, iridium, cobalt, copper, vanadium, uranium, bismuth, cadmium, mercury and cerium. However, the method of this patent is limited in a number of ways. First, the use of an organic solvent that is (a) miscible with the carbonate and (2) is from only slightly soluble to insoluble in the medium is so preferred in this teaching as to be essentially required. Solvents contended to be suitable include benzene, o-xylene, m-xylene, p-xylene, diethyl ether, 4-methyl-2-pentanone, 2,4-pentandione, ethyl acetate, n-heptyl alcohol and chloroform. It should be noted that almost all of these allegedly "suitable" solvents are in essence highly unsuitable for one or more reasons. For example, many have toxicity concerns such as being carcinogens, e.g. benzene. Other materials are too volatile, have strong odors, flash points which are too low or are dangerous due to peroxide formation. For example, diethyl ether is very flammable and has a severe fire and explosion hazard. Chloroform is a known carcinogen and further is a hazard to the ozone layer. Second, the only cyclic carbonates demonstrated as effective are ethylene carbonate and propylene carbonate. Third, to achieve immiscibility or improved extraction, the '801 patent frequently uses added NaCl—this technique is poor because salt is highly corrosive.

It would be desirable if new materials could be developed which efficiently extracted precious metal ions from aqueous solutions selectively and in an extremely efficient manner. Preferably such a process would not require a solvent other than the carbonate itself. Therefore, the use of toxic, flammable co-solvents could be avoided. Note that the method of the '801 patent must use a solvent with ethylene carbonate because ethylene carbonate is 100% water soluble. In any economical sense, the '801 method is undesirable because of the solubility of the carbonates taught therein in water. Propylene carbonate is soluble in water at 25 g of propylene carbonate to 100 g $H_2O$. While NaCl may be added to prevent this, the salt undesirably increases corrosiveness. Either alternative of losing the carbonate to the water or using the salt is disfavored.

SUMMARY OF THE INVENTION

Accordingly, it is an object of the present invention to provide a process for the extraction of metal ions that does not require the use of an organic co-solvent for the extracting agent to be miscible in or the use of an alkali metal salt, e.g. NaCl or other salting out agent to render the ethylene or propylene carbonate less soluble. As noted above, organic solvents are very likely to be toxic, flammable, odorous and/or peroxide forming or ozone depleting.

Another object of the invention is to provide a technique for extracting metal ions that is very efficient and removes more than 95% of the ions from the aqueous solution.

In carrying out these and other objects of the invention, there is provided, in one form, a process for extracting metal ions from aqueous solutions involving contacting an aqueous solution containing metal ions with an effective amount of an organic carbonate selected from the group consisting of cyclic 1,2-alkane carbonates having at least 11 carbon atoms and open chain carbonates having a total number of carbon atoms ranging from 21 to 37, in the absence of an organic solvent.

DETAILED DESCRIPTION OF THE INVENTION

It has been discovered that cyclic carbonates such as 1,2-decane carbonate will extract more than 99.9% mercury, 99.76% gold, 97.5% silver and 79.0% platinum front aqueous solutions. It was remarkable and totally unexpected that such high selectivities for certain precious metal extractions were shown by this cyclic carbonate, especially in light of the finding that 1,2-decane carbonate did not appreciably extract palladium, rhodium or copper (see Example 4, below; less than 15% extracted in each case).

The suitable carbonates fall into two general groups, cyclic carbonates and open chain carbonates. In one preferred embodiment of the invention, the cyclic carbonates are 1,2-cyclic carbonates having at least 11 carbon atoms. In another embodiment, the cyclic carbonates of this invention may have the structure:

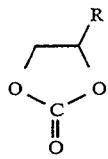

where R is a straight or branched alkyl group of 3 to 20 carbon atoms; preferably 8 to 20. Particularly preferred 1,2-cyclic carbonates falling within all of these definitions include 1,2-decane carbonate and 1,2-dodecane carbonate.

The open chain carbonates preferably have a total number of carbon atoms ranging from 21 to 37, in one embodiment. In one preferred embodiment, the total number of carbon atoms is from 21 to 29, such as from di(n-octyl)carbonate to di(n-tetradecyl)carbonate. In another embodiment of the invention, the open chain carbonates may have the formula:

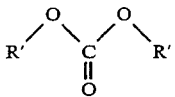

where each R' is independently a straight or branched alkyl of at least 10 carbon atoms and where the total number of carbon atoms in both R' groups is between 10 to 36, preferably 20 to 28. A preferred open chain carbonate which falls within this definition is didecyl carbonate. This finding was surprising since diethyl carbonate was found to extract metals, particularly gold to some extent (Example 6, infra) and moving up in molecular weight di(2-ethyl-1-hexyl)carbonate extracted essentially nothing (Example 11), but then at still greater molecular weight, didecyl carbonate extracts gold fairly well (Example 12). Because higher molecular weight organic carbonates are employed, they are inherently insoluble in the aqueous solutions thus requiring no organic solvent to be present to facilitate the extraction.

Advantages of the carbonates of the invention include that they are not toxic, they have high flash points, they are biodegradable and are thus environmentally favorable materials, and their synthesis is well known in the art. The carbonates may be used in any amount effective to complex with the metal ions in aqueous solution. The metal ions that were extracted were present as chlorides or nitrates. Generally, the effective amounts of the carbonates will be readily determined by those skilled in the art. In one embodiment of the invention, the carbonates may be used in an amount ranging from about 5 to about 300 wt. % based on the weight of the aqueous solution containing the metal.

The inventive method can remove gold, silver, platinum, mercury and mixtures thereof in excellent yield. In one embodiment, the amount of these metal ions extracted is greater than 95% and can be greater than 99%, even approaching 100%. The aqueous solution of metal ions need not have sodium chloride or potentially hazardous co-solvents added to it to obtain excellent results.

Unexpectedly, none of the materials studied extracted palladium, rhodium, cobalt, nickel or copper well. U.S. Pat. No. 3,912,801 teaches that ethylene carbonate and propylene carbonate will extract gold, silver platinum, mercury as well as palladium, rhodium, iridium, cobalt, copper, vanadium, uranium, bismuth, cadmium and cerium. It is thus reasonable to conclude that the higher carbonates of the inventive method functions by a different mechanism than ethylene and propylene carbonate of U.S. Pat. No. 3,912,801. It is possible that more than one of the organic carbonates of this invention may be used at one time. However, if the organic carbonate is to be recovered and recycled, one skilled in the art may want to use only one carbonate to facilitate its recovery.

Generally, the process of the present invention involves contacting the aqueous solution containing metal ion or salt with an effective amount of the organic carbonate, removing the extract and separating the metal from the extract. More specifically, the process includes dissolving the desired metal from ores or other media containing ores, if necessary. In some cases, the metal will then be in extractable form as a stable complex or simple salt in aqueous solution, or may be further treated to be in extractable form. The organic carbonates of this invention can then be brought into contact with the metal-containing solution and agitated. The metal complex or salt will be extracted by the solvent in very large percentages. Finally, the metal-containing extract is separated from the aqueous layer in which it is insoluble and the metal recovered from the extract. The recovery of the metals from the extract is performed according to known techniques, such as those described in U.S. Pat. No. 3,912,801, incorporated by reference herein.

The method of using higher molecular weight organic carbonates will now be further illustrated with certain examples, which are meant to illuminate but not necessarily limit the claimed invention.

EXAMPLES 1–12

For each Example, 10 ml of an aqueous solution, generally containing 1000 ppm of various metal cations, as the nitrate or chloride salts, was extracted with 25 ml of a dialkyl or 1,2-cyclic carbonate, as specified. The results of these room temperature extractions for the cyclic carbonates are given in Table I. Open chain carbonate data are presented in Table II.

$$\text{Percent of cation extracted by carbonate} = \frac{\text{ppm cation removed}}{\text{ppm cation initially present}} \times 100$$

TABLE I

Extractions of Metal Ions Using Large Cyclic Carbonates

| | | Example 1 Propylene carbonate | | Example 2 1,2-butylene carbonate | | Example 3 1,2-hexane carbonate | | Example 4 1,2-decane carbonate | | Example 5 1,2-dodecane carbonate | |
|---|---|---|---|---|---|---|---|---|---|---|---|
| Cation Extracted | Level; Cation Initially Present | ppm[1] | %[2] | ppm | % | ppm | % | ppm | % | ppm | % |
| Cu (II) nitrate | 1000 ppm - Cu | 930 | 7.0 | | | | | 92.0 | 8.0 | | |
| Ag (I) nitrate | 1000 ppm - Ag | 790 | 21.0 | 890 | 11.0 | * | | 25 | 97.5 | <1 | >99.9 |
| Au (III) chloride | 1000 ppm - Au | 2 | 99.8 | 20 | 98.0 | * | | 2.4 | 99.76 | <1 | >99.9 |
| Pt (II) chloride | 1000 ppm - Pt | 7 | 99.3 | | | | | 210 | 79.0 | 42 | 95.8 |
| Hg (II) chloride | 1000 ppm - Hg | | | | | | | <1 | >99.9 | | |
| Pd (II) chloride | 1000 ppm - Pd | 310 | 69.0 | 540 | 46.0 | | | 860 | 14.0 | | |
| Rh (III) chloride | 1000 ppm - Rh | 760 | 24.0 | 790 | 21.0 | | | 920 | 8.0 | | |
| Co (II) nitrate | 1000 ppm - Co | | | | | | | 900 | 10.0 | | |
| Ni (II) nitrate | 1000 ppm - Ni | | | | | * | | 880 | 12.0 | 990 | 1.0 |
| Ag + Cu nitrate | 500 ppm - Ag, Cu each | | | | | | | | | <1 Ag 470 Cu | >96.0 6.0 |
| Pt, Au + Cu | 100 ppm - Pt, Au, Cu each | Au = 1 Pt = 3 Cu = 88 | 99.0 97.0 12.0 | NES[3] <10 <10 | — >90.0 >90.0 | | | | | <1 Au <4 Pt 90 Cu | >96.0 >99.0 10.0 |

[1] ppm metal ion concentration in aqueous solution after 10 mL of aqueous solution was extracted with 25 mL of carbonate.
[2] per cent extracted by the carbonate.
*1,2-hexane carbonate was tried as an extractant for Ag, Au and Ni, but phases did not separate in the absence of a solvent; an emulsion formed instead.
[3] NES = not enough sample to do determination.

TABLE II

Extractions of Metal Ions Using Large Open Chain Carbonates

| | | Example 6 Diethyl carbonate | | Example 7 Dipropyl carbonate | | Example 8 Di-n-butyl carbonate | | Example 9 Di-n-hexyl carbonate | | Example 10 Di-n-octyl carbonate | | Example 11 Di(2-ethyl-1-hexyl) carbonate | | Example 12 Di-n-decyl carbonate | |
|---|---|---|---|---|---|---|---|---|---|---|---|---|---|---|---|
| Cation Extracted | Level; Cation Initially Present | ppm | % | ppm | % | ppm | % | ppm | % | ppm | % | ppm | % | ppm | % |
| Cu (II) nitrate | 1000 ppm - Cu | | | | | | | | | | | | | | |
| Ag (I) nitrate | 1000 ppm - Ag | 830 | 17.0 | 780 | 22.0 | 1000 | 0.0 | 930 | 7.0 | 940 | 6.0 | 950 | 5.0 | 1000 | 0.0 |
| Au (III) chloride | 1000 ppm - Au | 280 | 72.0 | 810 | 19.0 | 770 | 23.0 | 850 | 15.0 | 840 | 16.0 | 1060 | 0.0 | 230 | 77.0 |
| Pt (II) chloride | 1000 ppm - Pt | | | | | | | | | | | | | | |
| Hg (II) chloride | 1000 ppm - Hg | | | | | | | | | | | | | | |
| Pd (II) chloride | 1000 ppm - Pd | 1000 | 0.0 | 990 | 1.0 | | | 980 | 2.0 | 980 | 2.0 | | | | |
| Rh (III) chloride | 1000 ppm - Rh | 940 | 6.0 | 910 | 9.0 | 960 | 4.0 | 890 | 11.0 | 880 | 12.0 | | | | |
| Co (II) nitrate | 1000 ppm - Co | 880 | 12.0 | | | | | | | | | | | | |
| Ni (II) nitrate | 1000 ppm - Ni | 870 | 13.0 | | | | | | | | | 980 | 2.0 | 1000 | 0.0 |
| Ag + Cu nitrate | 500 ppm - Ag, Cu each | | | | | | | | | | | | | | |
| Pt, Au + Cu | 100 ppm Pt | | | NES | — | 100 | 0.0 | 100 | 0.0 | 91 | 9.0 | | | | |
| | 100 ppm Au | | | NES | — | 100 | 0.0 | 73 | 27.0 | 100 | 0.0 | | | | |
| | 100 ppm Cu | | | 93 | 7.0 | 100 | 0.0 | 100 | 0.0 | 97 | 3.0 | | | | |

From Table I it may be seen that 1,2-dodecane carbonate extracted more than 99.9% of the gold and silver from aqueous solutions and more than 95% of the platinum from aqueous solution (Example 5). 1,2-Dodecane carbonate also selectively extracted silver (>99.8%) from an aqueous solution containing equal parts of silver and copper, leaving most of the copper (470 ppm out of 500 ppm; 94% not extracted). This carbonate also selectively extracted platinum (>96%) and gold (>99%) from an aqueous solution containing equal parts of platinum, gold and copper, leaving most of the copper (90 ppm out of 100 ppm; 90% not extracted). 1,2-Decane carbonate extracted more than 99.7% of the gold and mercury from aqueous solution and more than 97% of the silver from aqueous solution (Example 4). However, 1,2-decane carbonate extracted less than 15% of the copper, palladium, rhodium, cobalt or nickel from aqueous solution.

Also from Table I, it can be seen that propylene carbonate extracted 99.8 and 99.3% of the gold and platinum, respectively, from aqueous solution (Example 1). However, propylene carbonate extracted 69.0% of the palladium from aqueous solution, 24.0% of the rhodium, 21.0% of the silver and only 7.0% of the copper from their respective aqueous solutions. Subsequent experiments indicate that propylene carbonate can selectively remove 98% of the gold from a mixed ion aqueous solution leaving essentially all of the present calcium, iron, manganese and magnesium. Similarly, propylene carbonate can remove 96% of the platinum from a mixed ion aqueous solution leaving at least 90% each of the calcium, iron, manganese and magnesium present.

The 17-carbon open chain carbonate di-(2-ethyl-1-hexyl) carbonate extracted less than 6% of the silver, gold and nickel from aqueous solution; see Table II, Example 11. Di-n-decyl carbonate, a 21-carbon open chain carbonate, extracted none of the silver from aqueous solution, but 77% of the gold from aqueous solution and none of the nickel (Example 12). Diethyl carbonate, a 5-carbon open chain carbonate, extracted 72% of the gold from aqueous solution and less than 20% of the silver, palladium, rhodium, cobalt, and nickel (Example 6).

Many modifications may be made in the process of this invention without departing from the spirit and scope thereof which are defined only in the appended claims. For example, one skilled in the art may discover that certain branched, relatively large cyclic or open chain alkyl carbonates may have particular advantage with respect to certain metal ions, or enhanced selectivities for certain metals in particular mixtures.

We claim:

1. A process for extracting metal ions from aqueous solutions comprising contacting an aqueous solution containing metal ions with at least about 5 wt. % of an organic carbonate based on the weight of the aqueous solution, the organic carbonate being selected from the group consisting of cyclic 1,2-alkane carbonates having the formula:

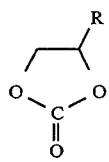

where R is a straight or branched alkyl group of 8 to 20 carbon atoms, and open chain carbonates having the formula:

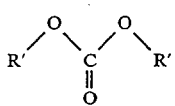

where each R' is independently a straight or branched alkyl of at least 10 carbon atoms and where the total number of carbon atoms in both R' groups is between 20 to 36, in the absence of an organic solvent and in the absence of an alkali metal salt, where the metal ions are selected from the group consisting of gold, silver, platinum, mercury and mixtures thereof.

2. The process of claim 1 where the organic carbonate is used in an amount ranging from about 5 to about 300 wt. % based on the weight of the aqueous solution.

3. The process of claim 1 where the metal ions in aqueous solution are bound in salts or complexes.

4. A process for extracting metal ions from aqueous solutions comprising contacting an aqueous solution containing metal ions with at least 5 wt. % of an organic carbonate based on the weight of the aqueous solution, the organic carbonate being selected from the group consisting of cyclic 1,2-alkane carbonates having the formula:

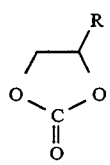

where R is a straight or branched alkyl group of 8 to 20 carbon atoms, and open chain carbonates having the formula:

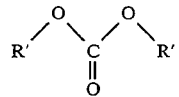

where each R' is independently a straight or branched alkyl of at least 10 carbon atoms and where the total number of carbon atoms in both R' groups is between 20 to 36, in the absence of an organic solvent and in the absence of an alkali metal salt, where the metal ions are selected from the group consisting of gold, silver, platinum, mercury and mixtures thereof, and they are extracted in a proportion of at least 95%.

5. The process of claim 4 where the metal ions in aqueous solution are bound in salts or complexes.

6. A process for extracting metal ions from aqueous solutions comprising contacting an aqueous solution containing metal ions with at least 5 wt. % of an organic carbonate based on the weight of the aqueous solution, the organic carbonate being selected from the group consisting of cyclic 1,2-alkane carbonates having the formula:

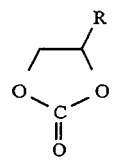

where R is a straight or branched alkyl group of 8 to 20 carbon atoms, in the absence of an organic solvent and in the absence of an alkali metal salt, where the metal ions are selected from the group consisting of gold, silver, platinum, mercury and mixtures thereof.

7. A process for extracting metal ions front aqueous solutions comprising contacting an aqueous solution containing metal ions with at least 5 wt. % of an organic carbonate based on the weight of the aqueous solution, the organic carbonate being selected from the group consisting of open chain carbonates having the formula:

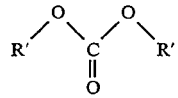

where each R' is independently a straight or branched alkyl of at least 10 carbon atoms and where the total number of carbon atoms in both R' groups is between 20 to 36, in the absence of an organic solvent and in the absence of an alkali metal salt where the metal ions are selected from the group consisting of gold, silver, platinum, mercury and mixtures thereof.

* * * * *